(12) United States Patent
Kim

(10) Patent No.: US 9,644,674 B2
(45) Date of Patent: May 9, 2017

(54) BEARING VARIABLE PRELOAD SYSTEM UTILIZING GAP BETWEEN STROKES FOR PRELOAD ADJUSTMENT AND ELASTIC DEFORMATION OF SEALING MEMBER

(71) Applicant: ECHO TECH CO., LTD., Gwangju (KR)

(72) Inventor: Sung Bok Kim, Gwangju (KR)

(73) Assignee: ECHO TECH CO., LTD., Gwangju (KR)

( * ) Notice: Subject to any disclaimer, the term of this patent is extended or adjusted under 35 U.S.C. 154(b) by 0 days.

(21) Appl. No.: 14/784,120

(22) PCT Filed: Mar. 13, 2014

(86) PCT No.: PCT/KR2014/002145
§ 371 (c)(1),
(2) Date: Oct. 13, 2015

(87) PCT Pub. No.: WO2014/200170
PCT Pub. Date: Dec. 18, 2014

(65) Prior Publication Data
US 2016/0069385 A1 Mar. 10, 2016

(30) Foreign Application Priority Data

Jun. 10, 2013 (KR) .......................... 10-2013-0066137
Jul. 12, 2013 (KR) .......................... 10-2013-0082336

(51) Int. Cl.
*F16C 25/08* (2006.01)
*F16C 33/72* (2006.01)
(Continued)

(52) U.S. Cl.
CPC .............. *F16C 25/08* (2013.01); *B23Q 1/265* (2013.01); *B23Q 1/70* (2013.01); *F16C 35/078* (2013.01);
(Continued)

(58) Field of Classification Search
CPC ........ F16C 19/06; F16C 19/548; F16C 25/08; F16C 35/067; F16C 2229/00;
(Continued)

(56) References Cited

U.S. PATENT DOCUMENTS 3,620,586 A * 11/1971 Maastricht .............. F16C 25/08
384/476
4,611,934 A * 9/1986 Piotrowski ............. B23Q 1/265
384/517
(Continued)

FOREIGN PATENT DOCUMENTS

EP 0997657 B1 1/1984
JP 07-024604 A 1/1995
(Continued)

*Primary Examiner* — Marcus Charles
(74) *Attorney, Agent, or Firm* — Rabin & Berdo, P.C.

(57) ABSTRACT

A bearing variable preload system utilizing gaps between strokes for preload adjustment and elastic deformation of a sealing member, according to the present invention, comprises: a housing; bearings provided to the housing; a spindle coupled to the inner wheels of the bearings so as to rotate; and a variable preload unit provided to the housing, applying variable preload to the outer wheels of the bearings; a chamber comprised inside a variable preload unit in which the airtightness is maintained by a sealing member located between the housing member and pressing member touched with the outer wheels of the bearing; a pressure supply unit supplying air or oil pressure to a chamber through a supply pipe provided to the housing so as to vary a preload applied to the outer wheel of the bearing.

10 Claims, 11 Drawing Sheets

(51) Int. Cl.
  *F16C 35/078* (2006.01)
  *B23Q 1/26* (2006.01)
  *B23Q 1/70* (2006.01)

(52) U.S. Cl.
  CPC ...... *F16C 2229/00* (2013.01); *F16C 2322/39* (2013.01)

(58) Field of Classification Search
  CPC .... F16C 2322/39; F16C 35/078; F16C 33/72; B23Q 1/265; B23Q 1/70; Y10T 409/307952; Y10T 409/309352
  USPC ........ 384/462, 477–479, 517–519, 563, 583; 409/231
  See application file for complete search history.

(56) References Cited

U.S. PATENT DOCUMENTS

| | | | |
|---|---|---|---|
| 4,657,412 A * | 4/1987 | McLarty | B23Q 1/265 384/1 |
| 5,386,630 A * | 2/1995 | Fox | B23P 19/04 29/407.08 |
| 5,388,917 A * | 2/1995 | Hibi | B23Q 1/265 384/493 |
| 5,803,619 A * | 9/1998 | Tabata | B23Q 1/265 384/518 |
| 5,810,483 A * | 9/1998 | Vites | B23Q 1/265 384/493 |
| 6,042,273 A * | 3/2000 | Thrasher | F16C 25/08 384/517 |
| 6,971,801 B2 * | 12/2005 | Miyazaki | F16C 25/083 384/504 |
| 7,371,011 B2 * | 5/2008 | McKeirnan, Jr. | F01D 25/16 384/504 |
| 8,656,803 B2 * | 2/2014 | Long | B25J 9/108 74/490.01 |
| 2006/0034670 A1 * | 2/2006 | Sugita | B23B 31/265 409/231 |
| 2006/0177168 A1 * | 8/2006 | Kitamura | F16C 19/55 384/517 |
| 2008/0112769 A1 * | 5/2008 | Mochizuki | B23B 31/265 408/124 |
| 2011/0081216 A1 * | 4/2011 | Ogura | B23Q 1/265 409/141 |
| 2012/0173012 A1 * | 7/2012 | Matsunaga | B23Q 1/70 700/177 |

FOREIGN PATENT DOCUMENTS

| | | | |
|---|---|---|---|
| JP | EP 2278181 A2 * | 1/2011 | ............. F16C 19/54 |
| JP | 2011-251385 A | 12/2011 | |
| KR | 91-14403 U | 8/1991 | |
| KR | 94-27675 U | 12/1994 | |
| KR | 96-29232 U | 9/1996 | |
| KR | 10-0246309 B1 | 4/2000 | |
| KR | 10-0925919 B1 | 11/2009 | |

* cited by examiner

BEARING VARIABLE PRELOAD SYSTEM UTILIZING GAP BETWEEN STROKES FOR PRELOAD ADJUSTMENT AND ELASTIC DEFORMATION OF SEALING MEMBER

CROSS-REFERENCE TO RELATED APPLICATIONS

This application claims priority to PCT/KR2014/002145, KR 10-2013-0082336 and KR 10-2013-0066137. The disclosures of these earlier applications are incorporated herein by reference.

FIELD OF INVENTION

The present invention is about variable preload system, the device wherein comprising variable preload system utilizing the gap of the strokes and elastic deformation of sealing members to adjust variable or static preload applied on outer wheels of the bearings supporting a spindle used as a means to high rate rotation.

BACKGROUND TECHNOLOGY

The performance of the axial system in the machine tool and the life span of the bearing have strong reliance on preload applied to bearings, in proper intensity regarding to rev count and utilizing condition, by which can reduce a vibration of the spindle. A preload applied on the spindle has an effect on: improving surface profile of a structure; increasing the life span and reducing heat of the spindle. Therefore selection and utilization of a preload according to the processing condition of the machine tool are necessary.

The condition and appropriate preload application of a machine tool includes: strong cutting work with low speed spindle rotation, which requires strong preload; light cutting work with high speed spindle rotation, which requires light preload. By that, applying the same 20 intensity of preload among those cases is not appropriate.

Basically, a bearing combination composed to supply proper preload on spindle for securing proper spindle hardness matching the working condition accordingly. However, for above reason, the preload should be selectively applied following the working condition of two: fast speed rotation; low speed rotation.

I admit there are lots of advantages lying on spindle comprising preload varying structure, while such structure comes with problems: requiring too much for installation; comprising complex structure; high cost problem, which leads to the restriction of actual use.

For reference, high speed spindle (1 million or plus rate of DN degree) experiences undesirable preload variation when the ball forced to move toward outer wheel of the bearing as pressure increases dramatically by centrifugal force derived from inner wheel and the ball of the bearing. In case of static preload method, means for applying static and variable preload is appropriate.

The purpose of applying preload to an axial system of a machine tool is to let spindle to select its position choice in the direction of spindle (axial direction) and radial direction, and to gain effect of: reducing vibration of spindle; hardening the intensity of the bearing; reducing resonance and vibration of spindle direction; reducing circling slip, revolve slip and rotary slip; maintaining proper position regarding orbit wheel. Thus, preload of the bearing have a huge effect on the intensity of the spindle, vibration, noise, heat and accuracy of work according to its method and preload condition. Mainly, static preload is for high rate rotation and static position preload is for low rate rotation and low variation of rotation. It is typical to apply high preload to high rate rotation and low preload to low rate rotation.

KR patent 0246309 introduces pre-pressure change device of main shaft bearing. The invention comprises: A cylinder fixed in either side to pressing member with minute gap and to the retention assembly, providing a piston at its inner side so as to apply pressure to pressing member for intensifying preload of the bearing when the main axial rotate in low rate; A bearing preload spring provided at the side of the retention assembly, pushing pressing member to apply preload on bearing if the main axial rotate in high rate. An oil supply pipe provided in the retention assembly to supply pressure to the piston when the main axial rotate in low rate; A elasticity spring continuously pushing the piston to its original position when the main axial rotate in high rate.

KR patent 96-29232 shows preload controlling device utilizing PZT (piezoelectric element), and KR patent 94-27675, 91-14403 and EP 00997657 and U.S. Pat. No. 4,611,934 show Bearing preload variation system.

The means of utilizing PZT for controlling preload stated in current method show fast reactance rate but require great deal of space and cost, restricting the actual application of the method.

KR patent 0925919 states bearing variable preload system utilizing compressed air comprising: A sleeve provided to apply preload to outer wheel of the bearing coupled to outer side of high speed rotatable spindle; The sleeve moves along with the piston forced by compressed air.

The overall Bearing variable preload systems have following problems.

1: Their structure are difficult to apply accurate preload with its structure providing the bearing sleeve installed between the outer wheel of the bearing and the housing, since the action point of outer wheel of the bearing moves to outer side.

2: Because of the structure of forming the bearing sleeve between the outer wheel of the bearing and the housing, the main axial goes relatively bigger or the bearing supporting the spindle becomes small. Minimizing the bearing increases the Maximum permissible RPM, while reducing the preload applied and in point of the size of preload, among the difference between the upper and the underside, the smaller shows shortening its life-span.

CROSS REFERENCE TO RELATED APPLICATIONS

Priority Patent WO2014/200170 A1
Priority Patent KR 10-2013-0066137
Priority Patent KR 10-2013-0082336
KR patent 0246309
KR patent 96-29232
KR patent 94-27675
KR patent 91-14403
EP 00997657
U.S. Pat. No. 4,611,934
KR patent 0925919

DESCRIPTION OF INVENTION TASK PROBLEMS

The present invention is to provide the bearing variable preload system utilizing the gap of stroke and elastic deformation of sealing member for solving following problems:

not requesting additional space for applying preload; minimizing structure complexity; increasing the degree of freedom of design.

To provide means for solving above problems, the present invention provides the bearing variable preload system utilizing the gap of stroke and elastic deformation of sealing member of which has an effect of: easiness of controlling preload applied to the bearing provided to the main axial of a machine tool; reducing vibration of spindle; improving surface profile of product.

Another goal of the present invention is to providing the bearing variable preload system utilizing the gap of stroke and elastic deformation of sealing member available for controlling preload in such condition of zeroing the stroke between the housing and the pressing member pressing the outer wheel of the bearing Another goal of the present invention is to providing the bearing variable preload system utilizing the gap of stroke and elastic deformation of sealing member for utilizing air pressure to control preload as the invention provides relatively big pressure applying cross-section area for applying preload to the outer wheel of the bearing.

The other goal of the present invention is to providing the bearing variable preload system utilizing the gap of stroke and elastic deformation of sealing member easing the variation of preload according to rotation rate of the spindle, which makes it easy to control, coming with requiring additional installation space, and minimizing cost of manufacturing.

MEANS FOR SOLVING TASK PROBLEM

The present invention, the bearing variable preload system utilizing the gap of stroke and elastic deformation of sealing member, has following effects
1: Securing installation space for the Bearing variable preload system is simple and doesn't require additional placing in the main axial system.
2: Controlling preload applied to the outer wheel of the bearing is easy either for high or low rate of rotation speed and with proper application of preload for changing rotation rate and condition, the invention can extend the life-span of the bearing, expecting the effect of reducing the vibration and heat of the spindle and improving the surface profile of product processed by the machine tool which adopts this invention.
3: Increasing efficiency of application of preload controlled by air or oil pressure by placing the action point, for preload, enforced to the outer wheel of the bearing to the outer side of the moving direction or the coaxial line of the bearing, which does not include adjusting the size of the bearing for applying preload. Wherein said, since it allows single standard of the bearing, the feature can be a fundamental answer to decreasing the life-span of the bearing caused by the difference of size in the bearing supporting the spindle so as to increase the rate of rotation.
4: Maintaining the spindle in the best condition by applying static preload by the spring and variable preload by air or oil pressure.
5: Providing proper, balanced preload to increase the life-span of the bearing by designing the upper and the underside of the bearing, for supporting the spindle, to have little difference in size less than 1 or 2 step according to the bearing standard (KS, JIS or ASM).
6: Without the rotation command, variation preload is not applied so as to ease the rotation of the spindle, which results in reducing fatigue of a worker and increasing productivity and product quality in broader way.
7: A ripple effect for related industry is expected since the present invention allows lowcost, less space for realize variable preload system.

DESCRIPTION FOR CURRENT INVENTION

The application examples, in FIG. 1 to FIG. 7, of the bearing variable preload system utilizing the gap of stroke and elastic deformation of sealing member are for applying static and variable preload to the bearing supporting the spindle of the main axial system of a machine tool according to the present invention.

Figure 1:
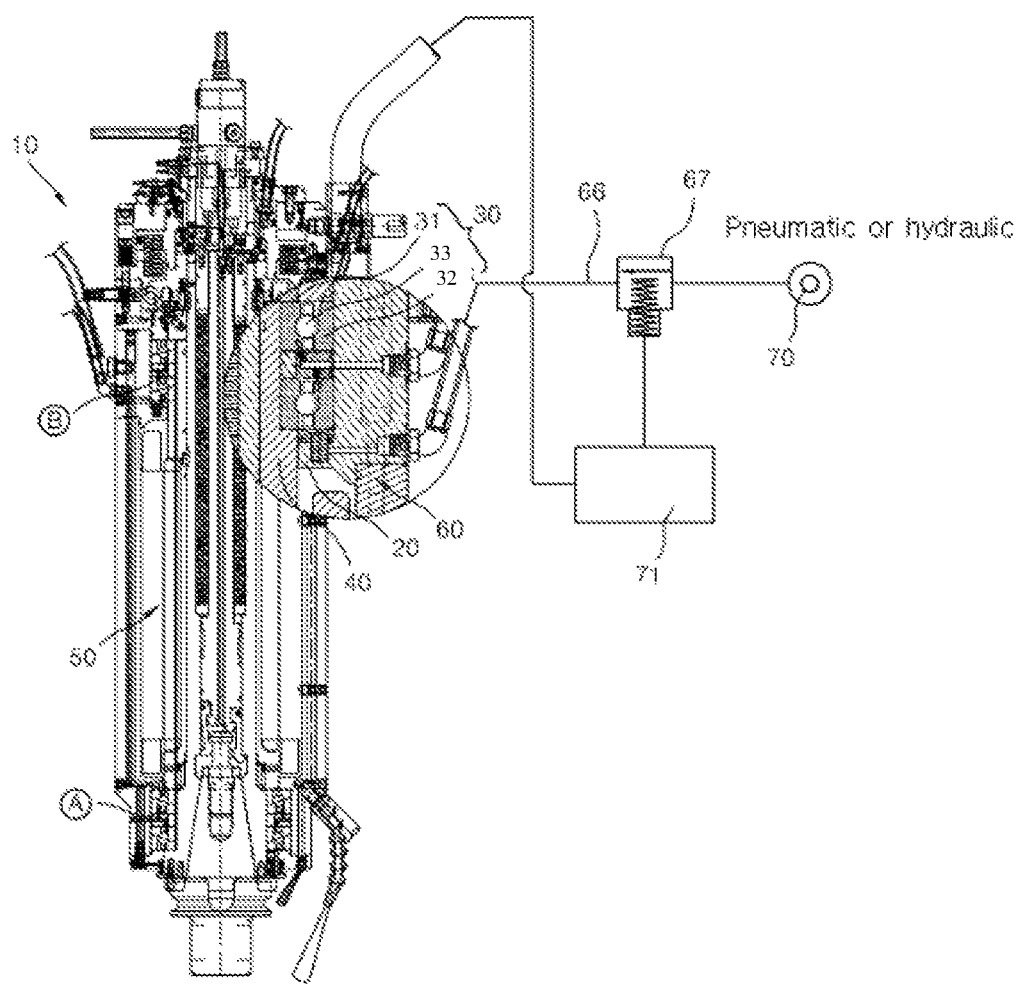
FIG. 1: A cross-sectional diagram for main axial system of the bearing variable preload system utilizing the gap of stroke and elastic deformation of sealing member.

In the FIG. 1, the bearing variable preload system utilizing the gap of stroke and elastic deformation of sealing member(10) provided to the housing of the main axial of a machine tool for applying preload to the outer wheel of the bearing, wherein comprises: the bearings(30) including inner wheel(31), outer wheel(32) and the ball(33) between them; A rotatable spindle(40) coupled to the inner wheel of the bearing(30) provided to the housing(20).

Between the bearings(30) can install a spacer, and the stator(50) of the motor can be provided to the housing(20) so as to rotate the spindle(40). The oil-mist can be formed as an oil lubricator to supply oil to the bearing(30), and chilling unit can be provided to chill out the main axial by the chiller.

A variable preload unit(60) is provided between the housing(20) and the outer wheel(32) of the bearings(30) so as to apply variable preload to the outer wheel(32) of the bearings(30).

Figure 2:
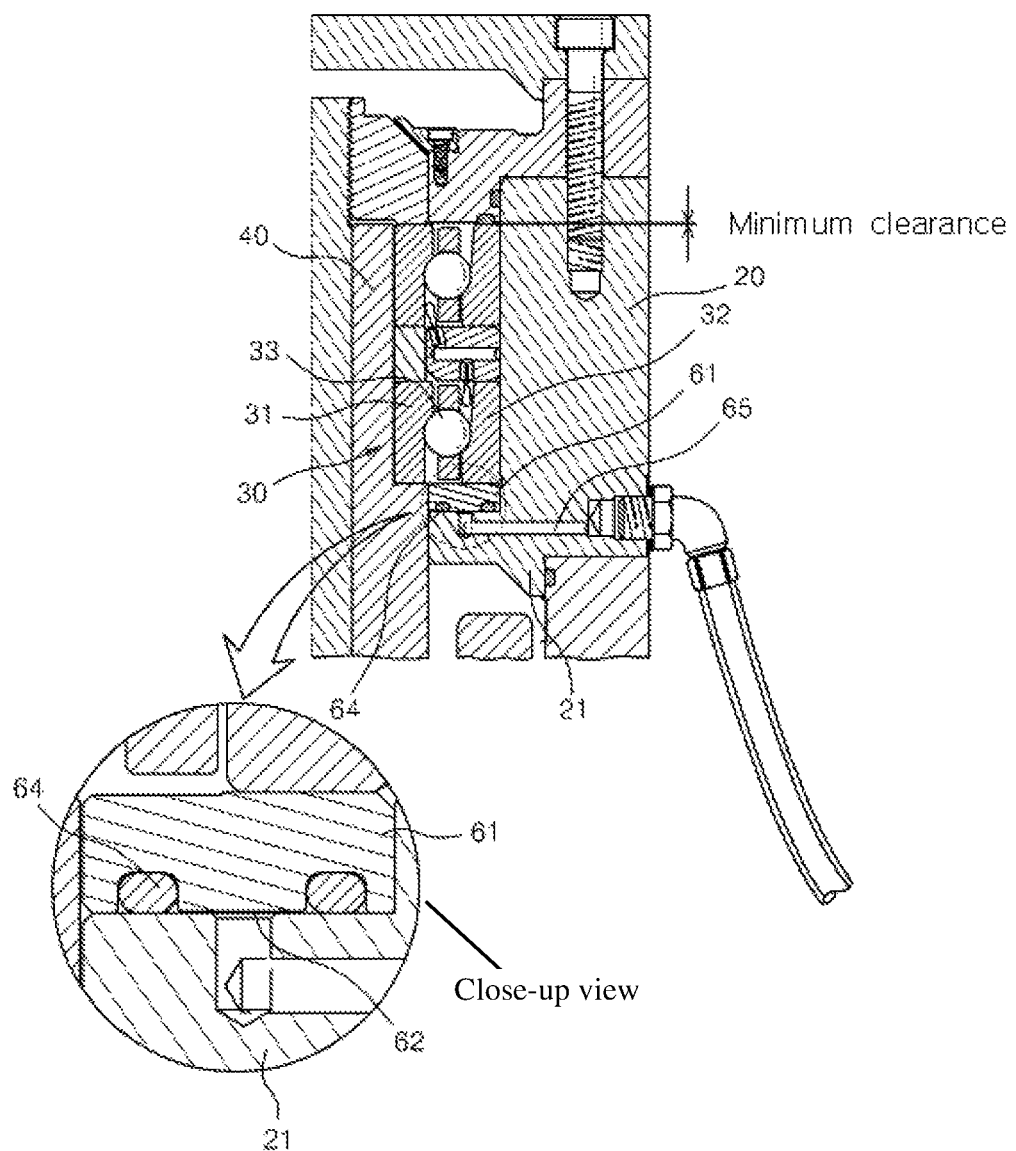
FIG. 2: A cross-sectional diagram for the bearing variable preload system utilizing the gap of stroke and elastic deformation of sealing member of FIG. 1.

A variable preload unit(60), according to FIG. 2, applies variable preload to the outer wheels of the bearings by air or oil pressure, coupled to the housing(20), comprises: pressing member(61) provided between the bearing housing member(21) supporting the bearing(30) and upper or under side of the outer wheel(32) of the bearings(30); between the bearing housing member(21) and the variable preload unit(60), wherein a chamber(62) is formed in which the airtightness is maintained by a sealing member(64) located between the bearing housing member(21) and the pressing member(61) touched with the outer wheels of the bearing. An O-ring can be used in the sealing member(64) to secure around the chamber(62), but it is not mandatory. The chamber is desirable to maintain a gap at least 0.01 mm or 0.02 mm to supply air or oil pressure.

Figure 3:
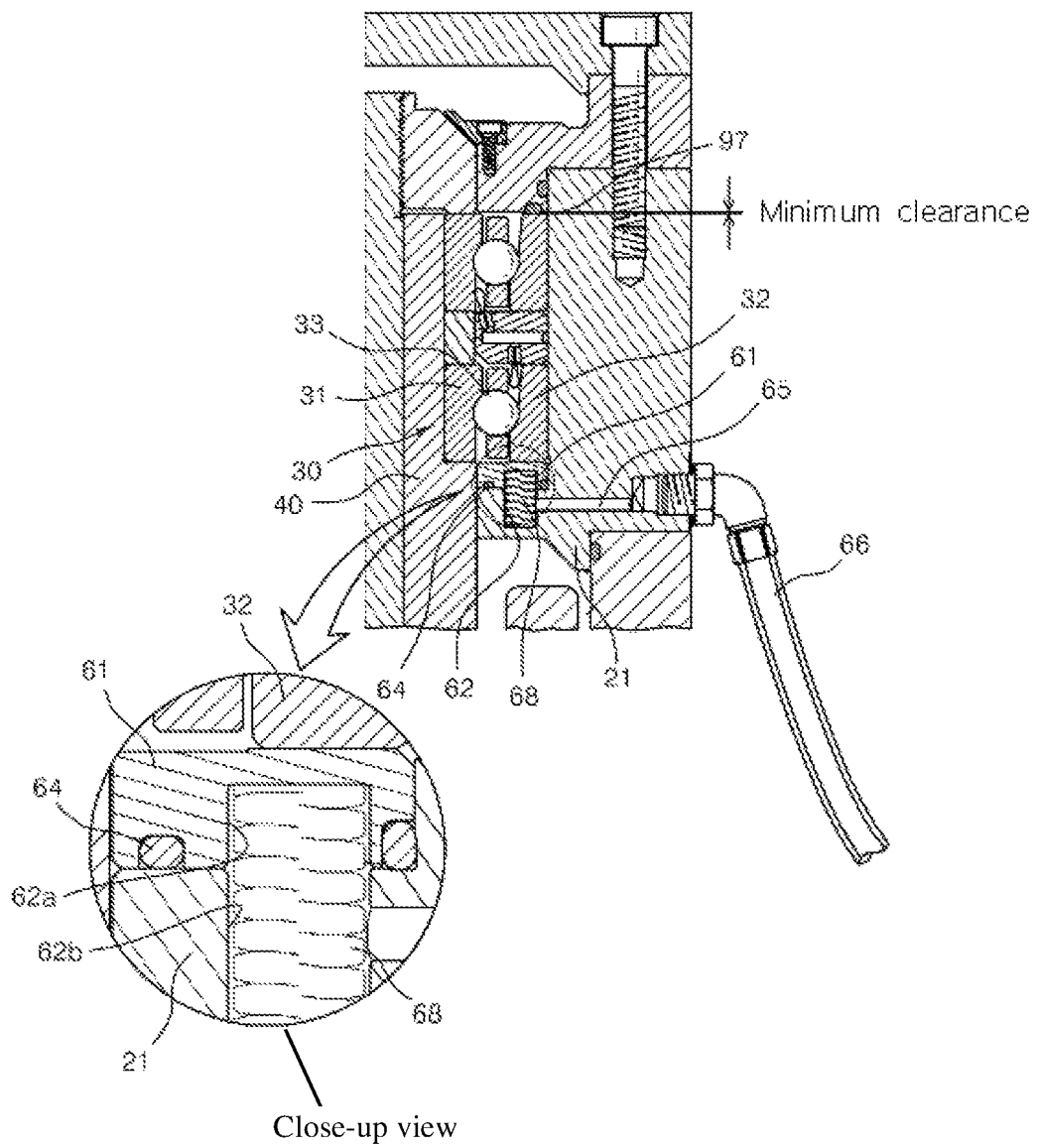
FIG. 3 to FIG. 7: A cross-sectional diagram for another example utilizing the bearing variable preload system utilizing the gap of stroke and elastic deformation of sealing member.

According to FIG. 3, the chamber(62) provided to the space formed by the sealing member(64) features the inlet part(62*a*)(62*b*) touching the side of the pressing member and the bearing housing member respectively, wherein the stroke, the gap between the pressing member(61) and the bearing housing member(21), may not necessarily be sustained. The inlet part(62*a*)(62*b*) formed between the pressing member(61) and the bearing housing member(21) enables the air or oil pressure to push up the pressing member(61) to apply preload to the outer wheel(32) of the bearings(30) supporting the spindle. If the stroke between the pressing member(61) and the bearing housing member(21) is zero, the minimum gap(97) is required for moving the pressing member to the upper axial direction of the outer wheels of the bearings.

And the chamber(62) is connected with the supply pipe(65) formed at the bearing housing member(21), which comprising: The pressure supply unit(70) coupled with supply pipe(65) by pipe(66) The regulator(67) varying the air pressure supplied through the pipe(66) according to the rotation rate of the spindle(40), controlled by the control member(71) detecting the rotation rate of the spindle(40). An additional rate or rotation sensing sensor can be provided to the main axial of the spindle. The pressure supply unit(70) may adopt an IAC (Instrument Air Compressor) for control.

And the spring(68) may be provided inside the chamber(62) for preload application as a FIG. 3 states. The coil or belleville spring or like can be proper for utilizing the spring(68). Like I stated, designed bearing variable preload system can be in a multiple size following the circumference trace of the outer wheels(32) of the bearings(30), Meanwhile, the spring(68) provided to the chamber(62) formed by the inlet part(62*a*)(62*b*) may supply static pressure on the outer wheels(32) of the bearings.

Figure 9:
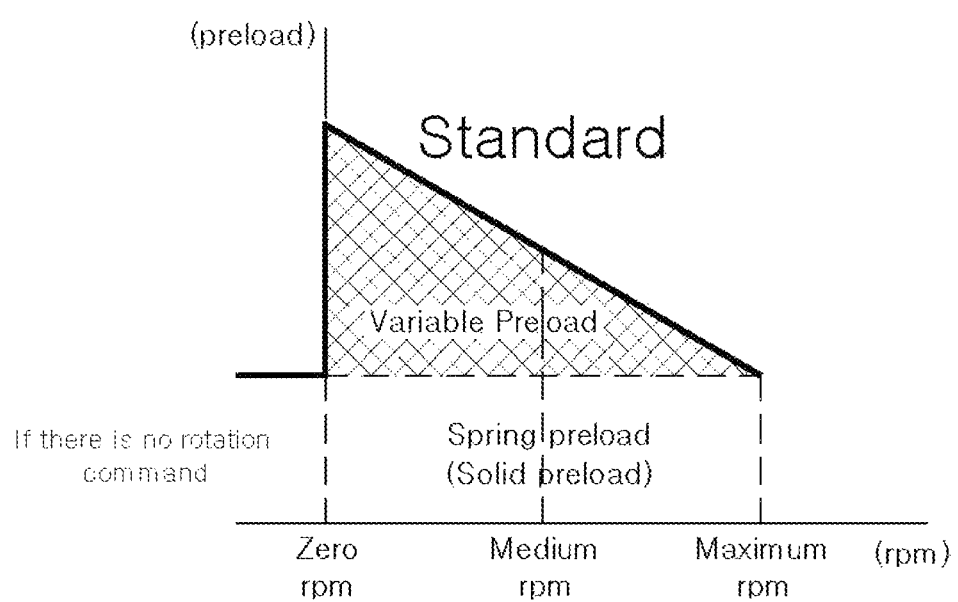
FIG. 9 to FIG. 11: A graph showing the variation of static or variable preload effective on the outer wheel of the bearing.
Figure 10:
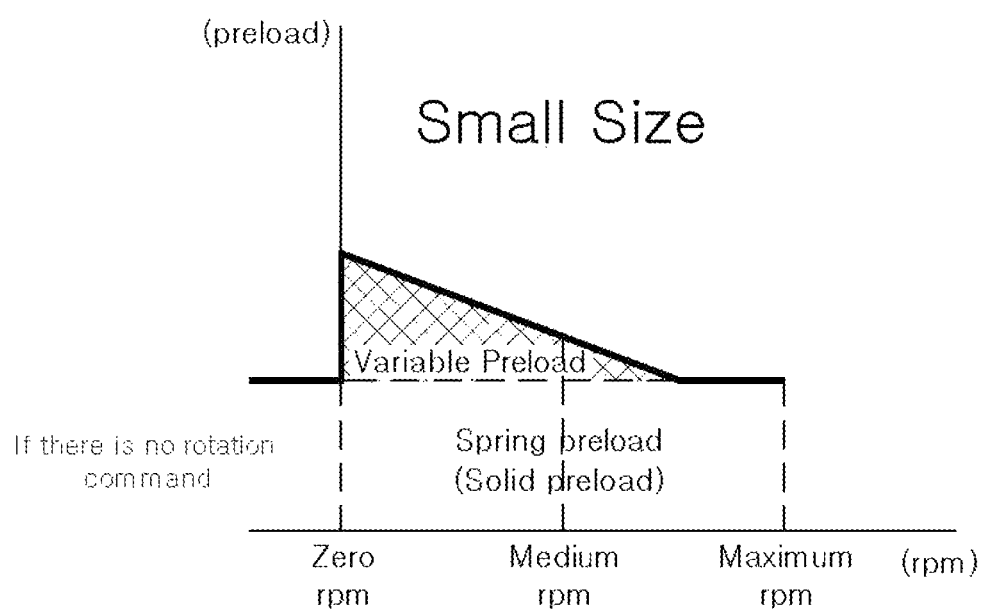
Figure 11:
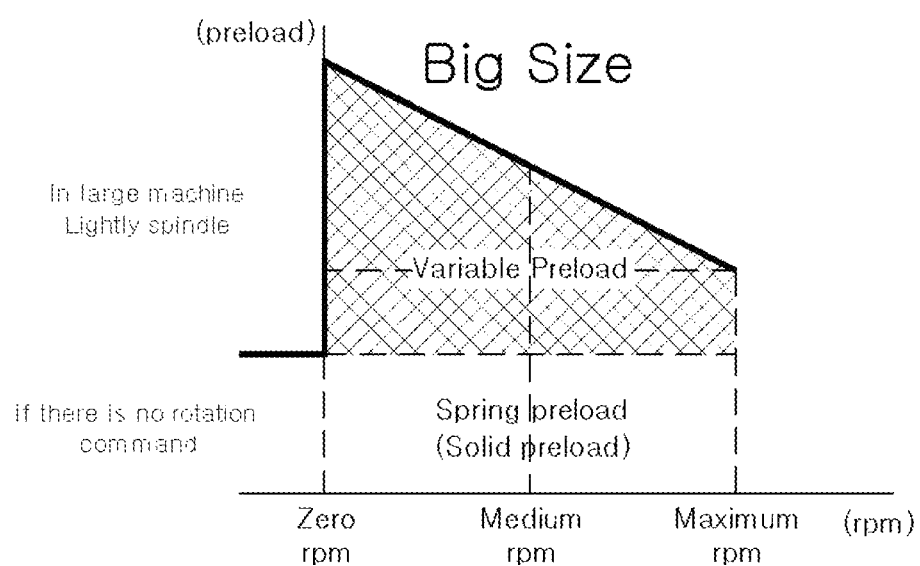

As stated in the FIGS. 9 to 11, the bearing variable preload system utilizing the gap of stroke and elastic deformation of sealing member(10) comprises supply pipe(65) and supply pipe(66) supplying relatively high air or oil pressure to the chamber(62), controlled by the pressure supply unit(70) from mending the regulator(67) by the control member along with, by the spring(68), the static pressure is applied to the outer wheel of the bearing as the spindle(40) rotates in low rate. Thus, the pressure is supplied as the pressing member(61) moves toward to the bearing(30), pressing the outer wheel(32) of the bearing(30). When the spindle rotates in high rate, the invention maintain desirable condition of the spindle by controlling the pressure applied to the chamber(62) so as to control the preload. The FIG. 9 shows the status when there is no command for rotation, without applying air or oil pressure to the chamber(62) by the pressure supply unit, only static preload is applied by the spring.

Specially, like in FIG. 2, without the spring for static preload, variable preload can be applied through the supply pipe(65) by supplying air or oil pressure to the chamber(62). In such case, the sealing member(64) between the pressing member(61) and the bearing housing member(21) is provided to maintain the minimum gap for preload. If a sealing device is provided to bearing housing member(21), it is not required to maintain the minimum gap. If there is no gap between the pressing member(61) and the bearing housing member(21), the either side of the bearings coordinate to have the minimum gap for applying preload to the outer wheel of the bearing.

Figure 4:
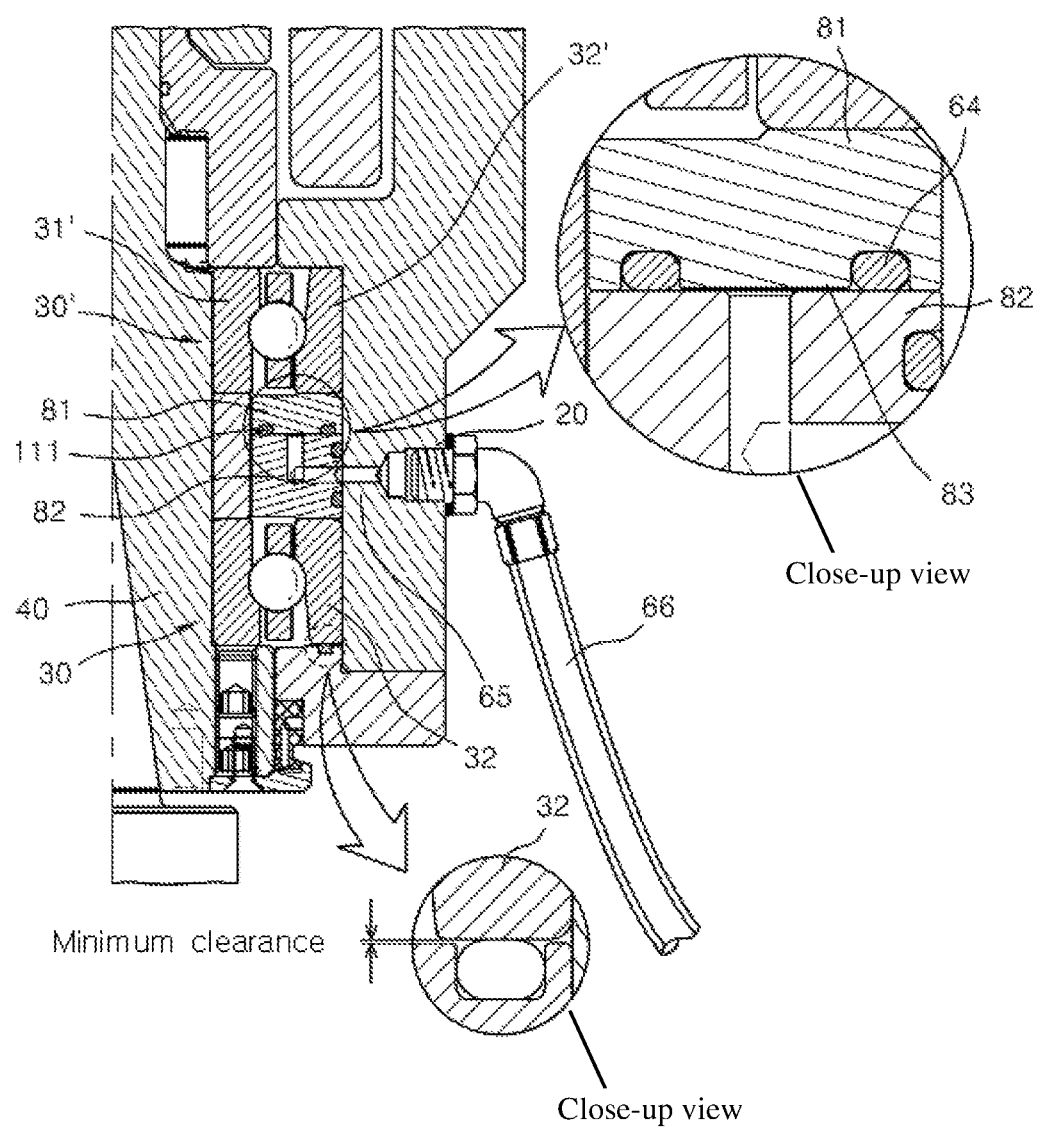
Figure 5:
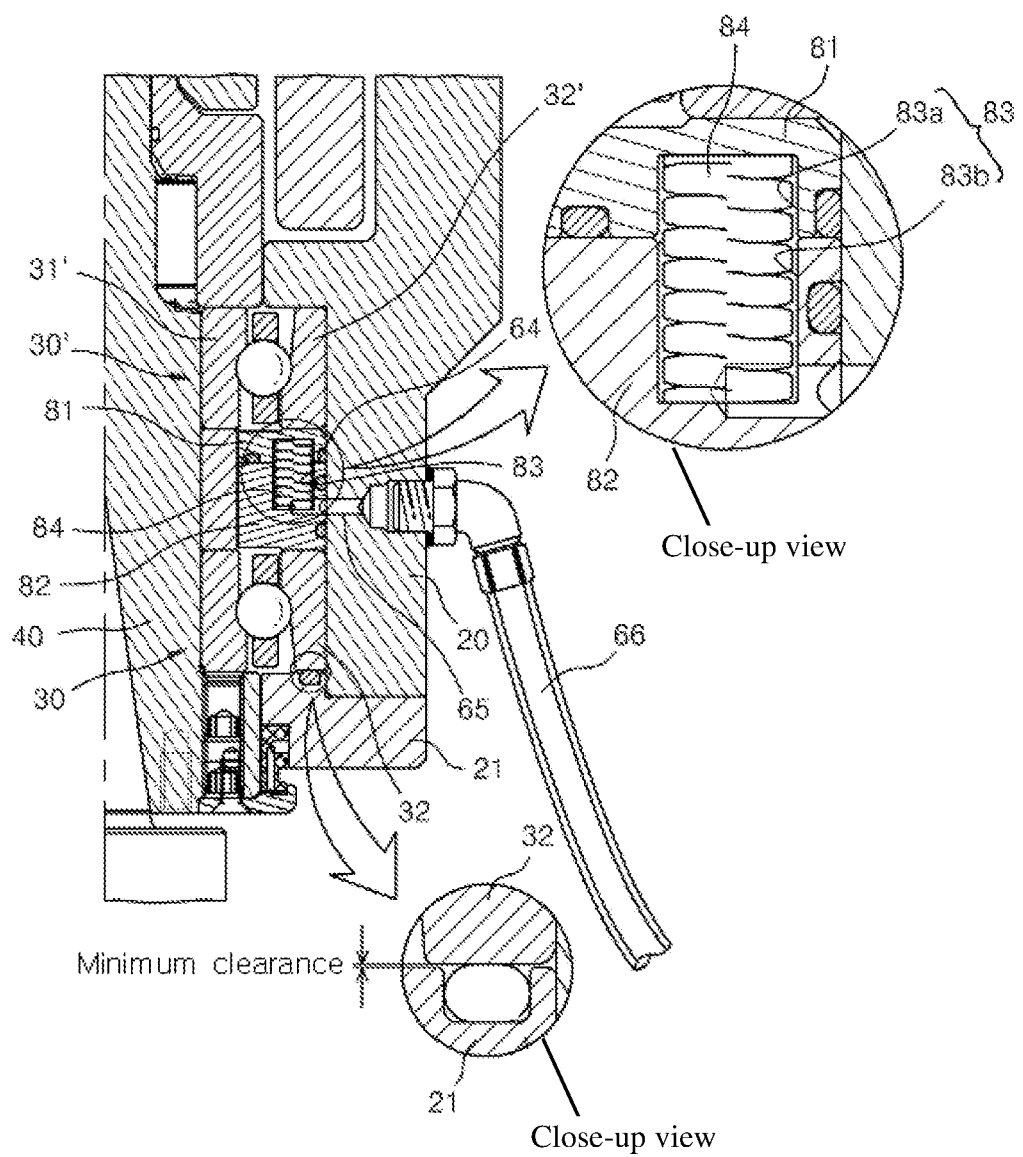

FIG. 4 shows another application for the bearing variable preload system utilizing the gap of stroke and elastic deformation of sealing member. The numbering for the part comprising the figure is the same as the above.

According to the figure, the bearing variable preload system of the present invention, when the bearings(30)(30') are installed closely, provides the spacer form pressing member 1(81) and 2(82) so as to apply preload to the outer wheels of the bearings. Pressing member 1(81) and 2(82) comprises the sealing member(64) to form the chamber(83) for supplying air or oil pressure.

The sealing member(64) provided between the pressing member 1(81) and 2(82) forms the orbit around the chamber(83) to maintain airtightness. In this case, the gap may be formed by the sealing member(64) between the pressing member 1(81) and 2(82).

The chamber(83) is formed either by: the sealing member(64) between the pressing member 1(81) and 2(82) as in FIG. 4; inlet part 1(83*a*) and 2(83*b*) matching side of the pressing members(81)(82). The chamber(83) provided by the pressing member 1(81) and 2(82) may comprises the spring(84) in its inner side so as to provide static preload but this is not necessary. The spring(84) provided between the pressing member 1(81) and 2(82) pushes the pressing member 1(81) and 2(82) in either direction for applying preload to the outer wheels(32)(32') of the bearings(30)(30').

And the pressing member(81) forming the chamber(83) is connected with the supply pipe(65) formed at the bearing housing member(21), which comprising: The pressure supply unit(70) coupled with supply pipe(65) by pipe(66) The regulator(67) varying the air pressure supplied through the pipe(66) according to the rotation rate of the spindle(40), controlled by the control member(71) detecting the rotation rate of the spindle(40). An additional oil supply pipe can be provide to supply lubricant to the pressing member 1(81) and 2(82).

Meanwhile, additional spacer can be provided between the pressing member 1(81) and 2(82) and the spindle(40)

And there is a gap formed between the outer wheel(32) of the bearing(30) and the bearing housing(21) for the movement of the outer wheel(32) of the bearing(30) in case of static or variable preload is applied to the outer wheel of the bearing, where comprises the elasticity member(85).

Figure 6:
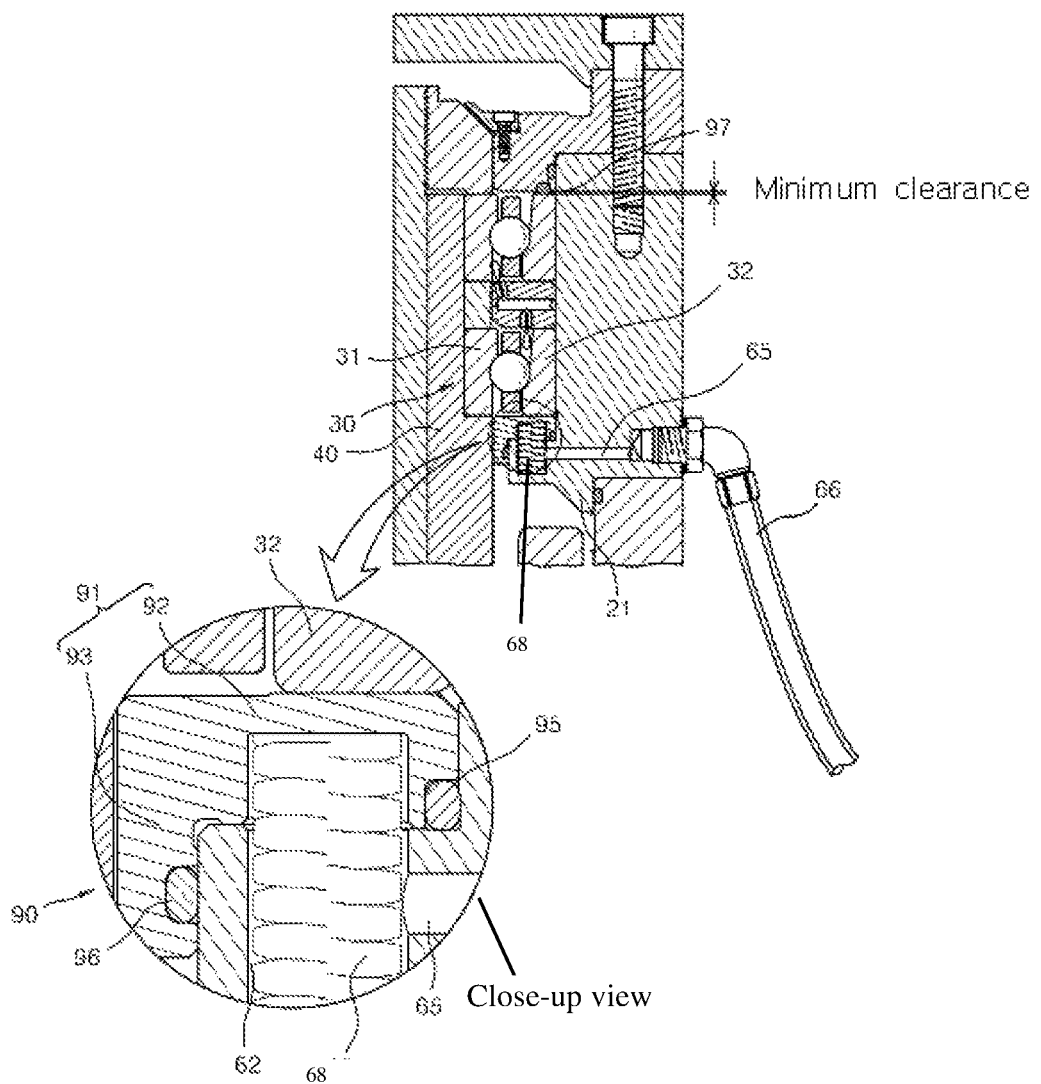
Figure 7:
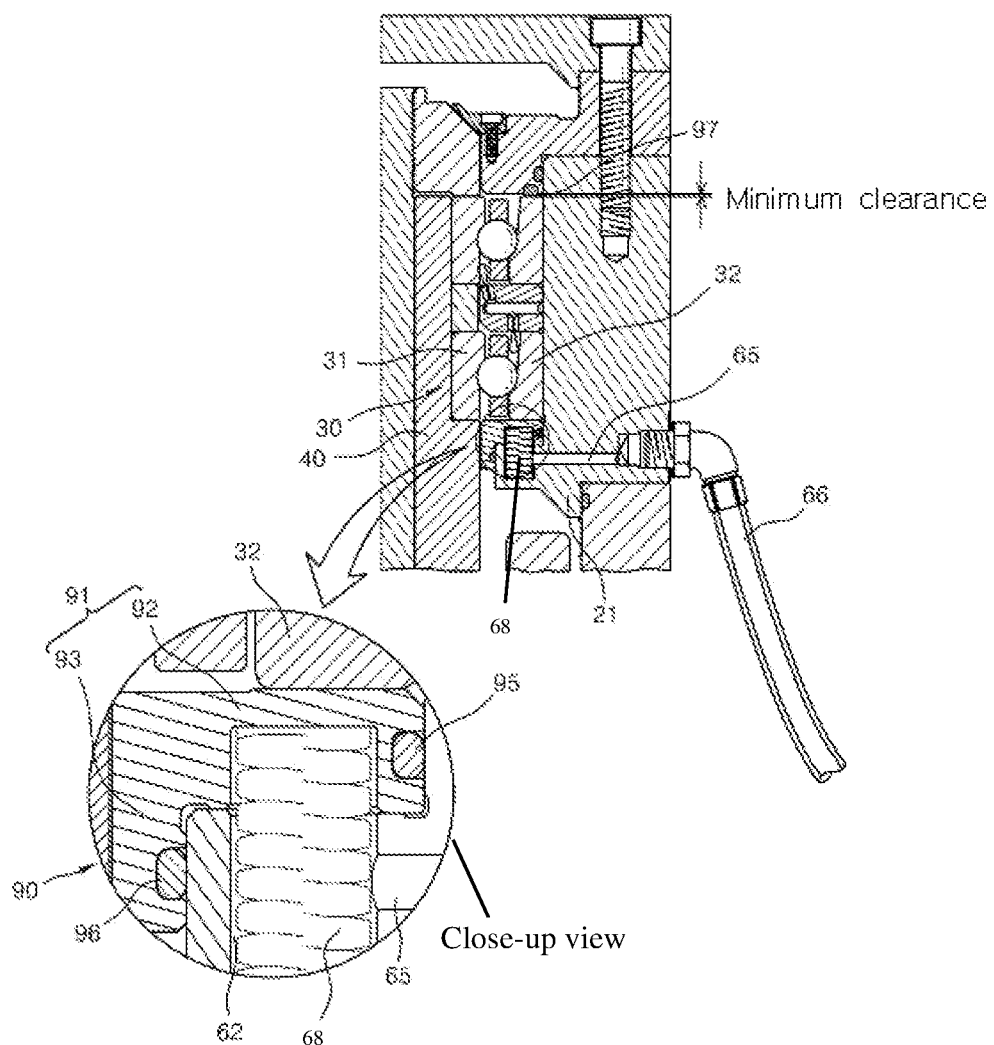

FIG. 6 and FIG. 7 show another applications for the bearing variable preload system utilizing the gap of stroke and elastic deformation of sealing member. The numbering for the part comprising the figure is the same as the above.

According to the figure, the variable preload unit(90), presenting in the invention, provides the pressing member(91) between the bearing housing member(21) formed with the housing(20) and the outer wheel(32) of the bearing(30). The pressing member(91) comprises: the preload member(92) meeting the outer wheel(32) of the bearing; The skirt member(93) extended from the bearing housing(21) to its stepped side; The chamber(62) formed between the preload member(92) of the pressing member(91) and the bearing housing member(21), which is connected with the supply pipe(65).

Wherein the edge between the preload member(92) of the pressing member(91) and the bearing housing member(21) and the inner surface of the bearing housing(21) and the skirt member(93), installed the sealing member 1(95) and 2(96). The sealing member 1(95) is installed between the preload member(92) of the pressing member(91) and the bearing housing member(21) to secure the gap maintaining airtightness of the chamber(62). As a means to controlling the preload, the gap is utilized within its minimum distance, forming the minimum gap(0.01 mm or 0.03 mm) between the outer wheel of the bearing and the housing.

Specially, as FIG. 7 states, when the sealing member 1(95) is installed between the outer surface of the preload member(92) and the bearing housing member(21), the gap of the pressing member states zero to apply preload to the outer wheel of the bearing. In this case, the space for the outer wheel of the bearing(30)(30') must be secured for preload control. (reference for FIG. 7)

The spring(68) can be installed to the chamber(62).

Another Application for the Invention

Figure 8:
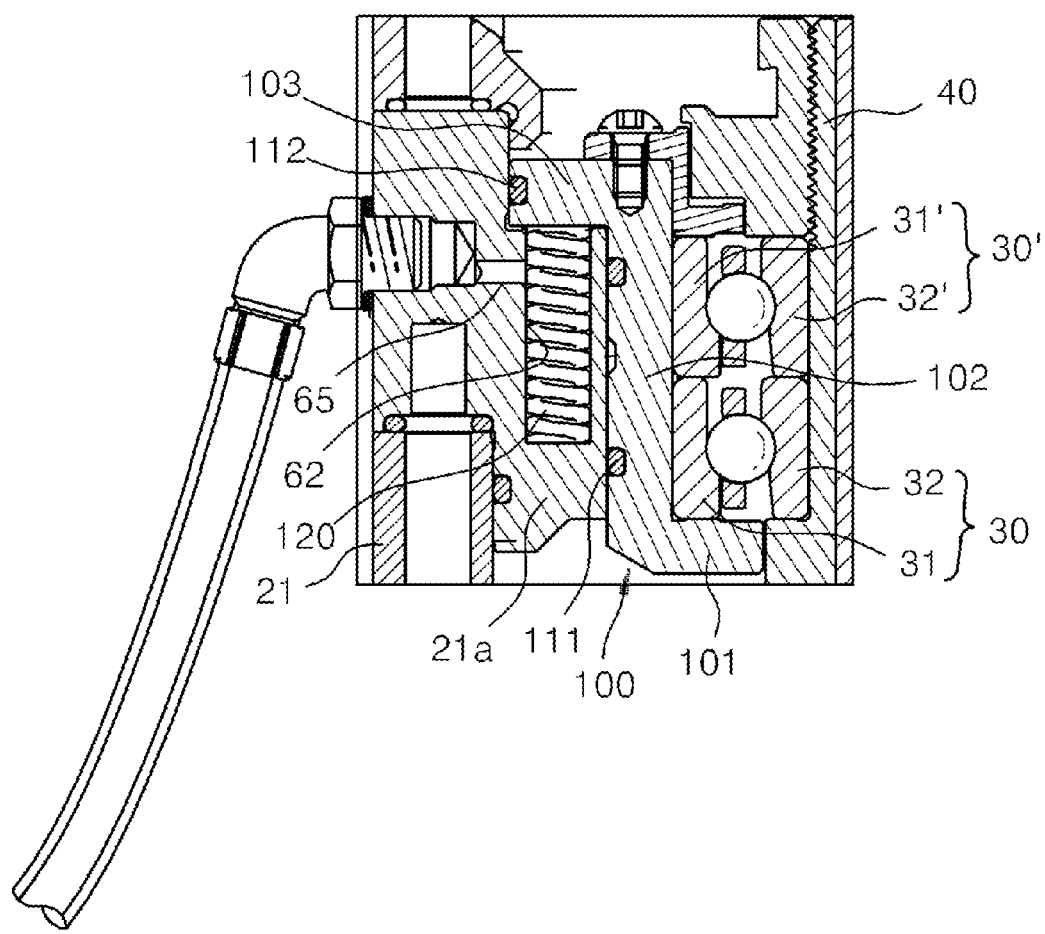
FIG. 8: A cross-sectional diagram for the other example utilizing the bearing variable preload system utilizing the gap of stroke and elastic deformation of sealing member.

FIG. 8 shows another applications for the bearing variable preload system utilizing the gap of stroke and elastic deformation of sealing member.

The figure states the bearing variable preload system comprising: Bearings(30)(30') provided to the housing(21); the spindle(40) coupled to the inner wheels of the bearings (30)(30'); the supporting member(101) provided between the outer wheel of the bearings(30)(30') and the stepped surface(21a) of the housing(21), meeting under side of the outer wheel of the bearing so as to apply preload; The outer wheel supporting member(102) extended from the supporting member(101) to the spindle direction, where between the inner surface of the stepped surface(21a) and the outer wheel of the bearings(30)(30'); The sleeve member(100) extended from the upper side of the outer wheel supporting member(102) to radius direction, comprising the flange member meeting the upper surface of the stepped surface (21a) of the housing(21).

And between the upper side of the stepped surface(21a) and the flange member(103) provides the chamber(62), where provides the sealing member 3(111) between the inner surface of the stepped surface(21a) and the outer wheel supporting member(102) and the sealing member 4(112) between the outer surface of the flange member(103) and the housing(21) so as to secure airtightness.

The chamber(62) may comprise the spring(120) as an elasticity member according to the example, and connected with the supply pipe(65) provided to the housing(21). As stated in the example, air or oil pressure is supplied to the supply pipe(65) by the pressure supply unit.

Conclusion

The bearing variable preload system, according to the present invention, provides the spring(84) between the pressing member 1(81) and 2(82) as in FIG. 3, can apply static preload to the outer surface of the bearings(30)(30') regardless to the rotation rate of the spindle(40), as stated in FIG. 6. Specially, appropriate static preload can be applied according to the maximum spinning rate by the sealing member provided between the pressing member and the bearing housing member.

And by supplying air or oil pressure through the supply pipe of the pressure supply unit 10 to the chamber, according to the spinning rate of the spindle, preload to the outer wheel of the bearing can be controlled.

As the compressed air depleted from the chamber(83), the pressing member 1(81) and 2(82) return to their original position, decreasing the force of the spring(84) pushing the outer wheel of the bearing, it eventually apply static preload appropriate to the maximum spinning rate of the bearing.

Therefore, when the spindle(40) rotates in high speed, without the air in the chamber(83), the bearings(30)(30') state with static preload, while in low speed, the compressed air provided to the chamber(83) applies variable preload.

As stated in FIG. 7, the preload can be applied to the outer wheel(32) of the bearing(30) by supplying the air or oil pressure to the chamber(62) while maintaining the stroke between the pressing member(91) and the bearing housing member(21) for controlling the preload zero, which minimizes the installation space for preload application.

Meanwhile, the bearing variable preload system applies variable preload to the outer wheel of the bearing within the supply of air or oil pressure to the chamber, the sleeve member(100), comprising the supporting member(101) meeting the outer wheel of the bearing and the flange member(103) forming the chamber(62) with the stepped surface(21a) of the housing, moves up to the bearing. Also, the spring(120) is provided to the chamber(120) to apply static preload.

And as stated in FIGS. 9 to 11, the force applied to the outer wheel of the bearing become stronger as centrifugal force acts with the spinning of the spindle, for which the preload can be applied to the spindle by the static pressure of the spring and the air pressure supplied to the chamber between the pressing member and the bearing housing member according to the spinning rate.

The present invention stating the bearing variable preload system utilizing the gap of stroke and elastic deformation of sealing member of which has an effect of: applying relatively high preload in low speed spinning; reducing preload in high speed spinning; extending the lifespan of the machine tool; reducing vibration of spindle; improving surface profile of product.

Following invention is described through stated examples, which are temporary for the people with standard knowledge of such field of technology who can figure out that another application is possible. Therefore, the genuine range for technical protection of the invention should be claimed according to attached claim range and to technical ideas.

What is claimed is:

1. A bearing variable preload system adjusting variable preload applied to outer wheels of bearings by utilizing a gap between strokes and elastic deformation of a member for sealing, the system comprising:
   a bearing housing member
   a housing;
   the bearings, the bearings being installed in the housing;
   a spindle coupled with inner wheels of the bearings so as to rotate;
   a variable preload unit provided to the housing so as to apply the variable preload to the outer wheels of the bearings, the variable preload unit including a pressing member and a sealing member, the sealing member being located between the bearing housing member and the pressing member in the variable preload unit, a chamber is formed in which sealing is maintained by the sealing member located between the bearing housing member and the pressing member, the pressing member touching the outer wheels; and
   a pressure supply unit supplying air or oil pressure to the chamber through a supply pipe provided to the housing so as to vary the preload applied to the outer wheels.

2. The system of claim 1 wherein said chamber is partitioned by the sealing member between the pressing member and the bearing housing member.

3. The system of claim 2 wherein said chamber includes a spring applying static pressure to the outer wheels.

4. The system of claim 2 wherein, in said chamber, inlet parts are formed respectively at a matching side of the pressing member and the bearing housing member, the matching side being partitioned by the sealing member.

5. The system of claim 1 wherein, in said chamber, inlet parts are formed respectively at a matching side of the pressing member and the bearing housing member, the matching side being partitioned by the sealing member.

6. The system of claim 1 wherein, in the variable preload unit, the pressing member includes a pressing unit provided between the bearing housing member and the outer wheels, wherein the pressing unit comprises:
- a preload member contacting with the outer wheels; and
- a skirt section extended from the preload member to a stepped surface of the bearing housing member;
- wherein between the preload member of the pressing unit and the bearing housing member is formed the chamber inserted therein;
- wherein the chamber is connected with a supply pipe provided to the bearing housing; and
- wherein the sealing member includes sealing members that are provided to each of
  - an edge between the pressing member and the bearing housing member, and
  - an edge between the bearing housing member and the skirt section.

7. A bearing variable preload system adjusting preload applied to outer wheels of bearings by utilizing gap between strokes and elastic deformation of a member for sealing, the system comprising:
- a housing;
- a sealing member;
- the bearings, the bearings being provided to the housing;
- a spindle coupled with inner wheels of the bearings so as to rotate; and
- a variable preload unit provided to the housing and which applies the preload to the outer wheels, the variable preload unit including pressing members having contact with an upper side and a bottom side of the outer wheels respectively;
- wherein a chamber is formed by the sealing member between the pressing member; and
- wherein the system further comprises a pressure supply unit supplying air or oil pressure to the chamber through a supply pipe provided to the housing so as to vary the preload applied to the outer wheels.

8. The system of claim 7, wherein said chamber further comprises a spring applying static pressure to the outer wheels.

9. The system of claim 7, wherein, in said chamber, inlet parts are formed at a matching side of the pressing members, the matching side being partitioned by the sealing member.

10. The system of claim 9 wherein said chamber further comprises a spring applying static pressure to the outer wheels.

* * * * *